Nov. 15, 1966  F. SHIRES  3,285,749
METHOD FOR PRODUCING AN EGG PRODUCT
Filed Feb. 28, 1964  2 Sheets-Sheet 1
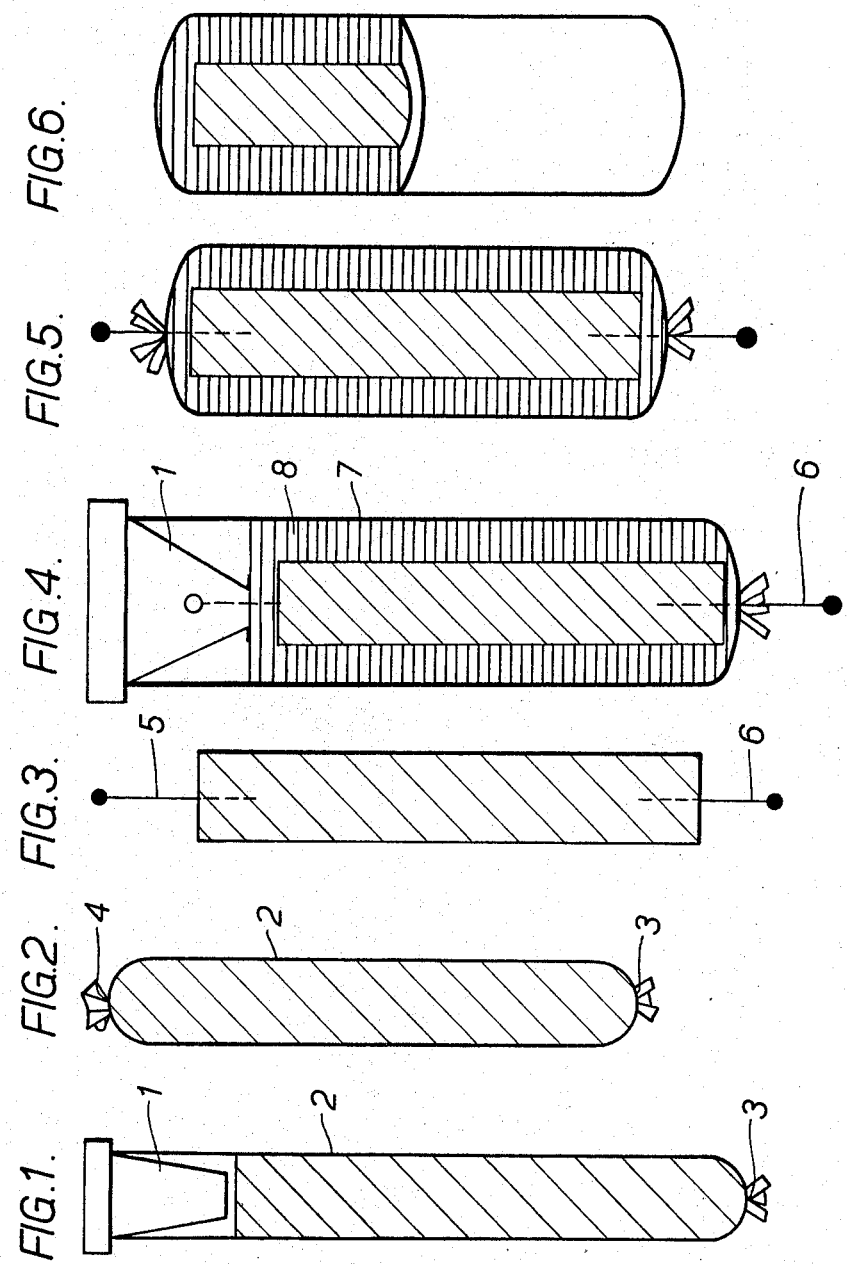

Nov. 15, 1966 F. SHIRES 3,285,749
METHOD FOR PRODUCING AN EGG PRODUCT
Filed Feb. 28, 1964 2 Sheets-Sheet 2
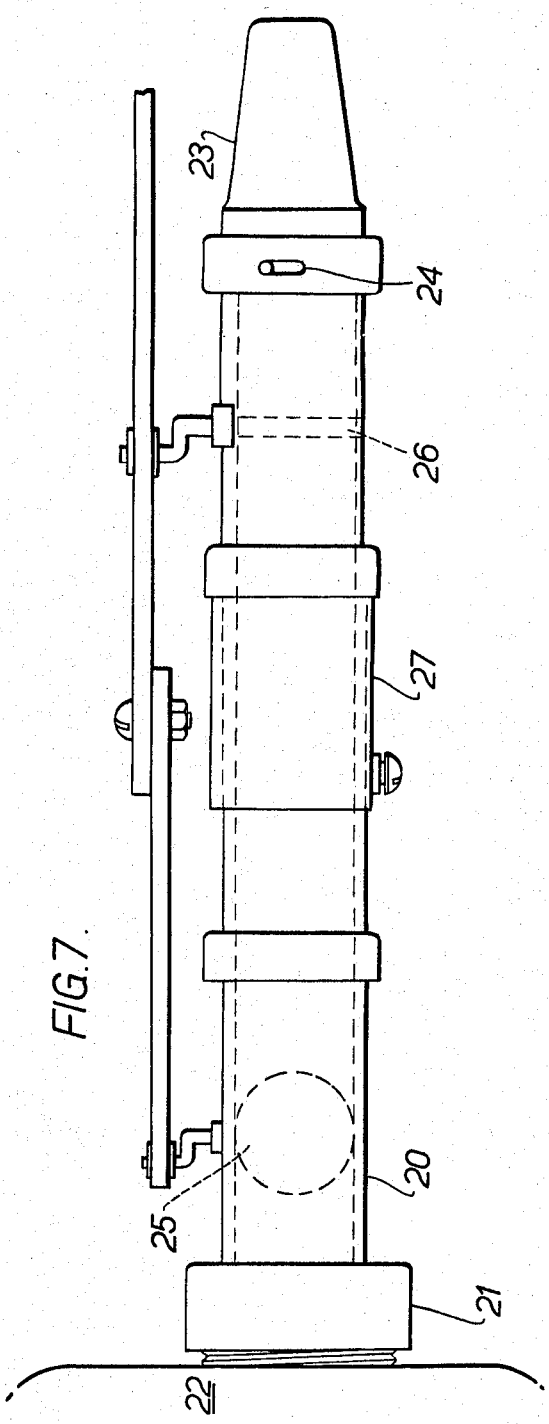

United States Patent Office 3,285,749
Patented Nov. 15, 1966

3,285,749
METHOD FOR PRODUCING AN EGG PRODUCT
Frank Shires, London, England, assignor to Emsway Limited, London, England
Filed Feb. 28, 1964, Ser. No. 348,246
5 Claims. (Cl. 99—113)

The invention relates to a method and means for producing an egg product in the form of a central core of egg yolk surrounded by an annular layer of egg white, the egg yolk and egg white being either in the form of the natural egg yolk and white, or in the form of frozen or dried egg yolk and white.

The invention has among its objects to provide an egg product in such a form as to make it more readily and conveniently adapted for use than is the product in its natural untreated form, such, for example, as an egg in the shell.

In the use of a natural egg which is hard-boiled so as to be adapted to be cut into sections for use in salads, sandwiches, meat pies, egg pies and the like, there is a disadvantage that the egg in its natural form and shape is difficult, after removal from the shell, to cut in such way as to provide equal distribution of the yolk and white in the slices, as the yoke to white ratio in the sliced egg varies from a maximum yolk content in the middle of the egg to none at the ends.

Again in the case of a meat pie one slice of the pie may contain a large preponderance of egg whereas another slice may contain no egg at all. In the case of oblong shapes each slice contains a varying amount of egg and varying amount of yolk and white.

A further object of the invention is to enable frozen eggs and dried eggs to be formed into cut slices with a layer of white surrounding a core of yolk as in a natural egg.

The invention has among its objects to provide an egg product comprising a yolk surrounded by a layer of white, or a product such as a Scotch egg containing yolk and white surrounded by a layer of sausage meat, in such manner that it can be cut so that each slice contains substantially the same amounts of constituents.

The invention has further among its objects to enable the amounts of the various constituents to be varied as desired. Thus it is an object of the invention to provide a method and means whereby the ratio of yolk to white may be varied as desired.

A further object of the invention is to enable materials or substances to be added to the constituent substances of the product. Thus for example flavouring, spices and the like may be added to the yolk or the white in producing an artificial egg.

According to the invention, a method for the production of an egg product comprises the steps of separating egg yolk from egg white, moulding the egg yolk to form an elongated body, coagulating the egg yolk, moulding the egg white to form a covering around the egg yolk, and coagulating the egg white.

According to the invention furthermore, yolks may be heated in boiling water or in near boiling water in their membranes before being broken up and passed into a cylindrical mould.

Where frozen eggs are used, the yolks are first frozen raw and the whites then frozen around the frozen yolk. The egg product must, before use, be boiled for a sufficient time to coagulate it to the same firmness and consistency as an unfrozen boiled egg. Where the product is frozen it will have a longer life than where hard-boiled.

The method of the invention may also be carried out with dried egg yolk and dried egg white as for hard-boiled eggs produced from the natural yolk and natural white.

The location of the formed solid core of egg yolk is preferably concentrically located in relation to the outer casing or container by means of aligned pins or the equivalent made of stainless steel or the like, which are caused to pierce respectively the solid egg yolk core at each end. Where the outer casing is a thin plastic tube one end is held as by a thread, string or the like, around one pin and threaded through the plastic; alternatively a clamp or the like may be used. The central core of egg yolk is thus held firmly in concentric relation with the outer cover or casing so that the egg white when poured into the outer casing will form a layer of uniform thickness around the egg yolk.

Apparatus for preparing a product consisting of yolk of egg in the form of a core surrounded by white of egg in the form of a surrounding annulus, may comprise a feeder consisting of a tube connected at one end to a tank or reservoir containing the egg white or egg yolk, and at the other end provided with a nozzle with a quick release collar, the intervening section of the feeder between the ends being formed as a tube having a valve near the outlet from the tank or reservoir and a similar valve near the nozzle to leave a space of determined length between the valves, which space may be varied in volume by connecting the two parts of the intervening section of the tube by means of an adjustable sleeve. The valves may be so connected that when one valve is open the other is closed and vice versa.

The invention further comprises the features of method and apparatus hereinafter described.

The invention is diagrammatically illustrated by way of example in the accompanying drawings, in which:

FIGURES 1 to 3 illustrate the essential steps in the formation of an inner core of egg yolk;

FIGURES 4 to 6 illustrate the essential steps in the second operation for surrounding a cylindrical core of egg yolk with a uniform layer of egg white, and FIGURE 7 is an elevation of means for feeding the egg yolk or egg white into the casing in which the ingredients are formed to predetermined sizes and shapes.

In one method of carrying out the invention referring to FIGURES 1 to 3 in the manufacture of an egg product according to the invention from natural egg yolk and egg white, a number of egg yolks are cooked while still in the membranes by being placed in boiling or near-boiling water. Contrary to expectation the yolks remain contained in their membranse and after a few minutes become firm, retaining the same crystalline structure as in a natural hard-boiled egg. Once the texture of the yolk has been fixed in the manner hereinbefore described it can be broken up and is easy to handle. It is then easy to fill the yolks into a thin plastic casing (tube) by any pressure filler, such for example as an ordinary sausage filler.

The egg yolk may however be broken up and fed through a tapered nozzle 1 into a plastic cylindrical casing 2 which is closed at the end 3 in any suitable manner. The casing is then sealed by closing the upper end 4 of the casing in any suitable manner. The product may, if desired, be further heated as by boiling in water for a period until it is quite firm. The boiled product in the form of a stick of yolk is then frozen until hard. The casing is then removed from the frozen yolk.

Pins 5, 6 of stainless steel are then inserted in axial alignment in the ends of the cylindrical stick of yolk, as illustrated in FIGURE 3.

The solid frozen cylindrical stick of yolk is then mounted concentrically in an outer thin plastic casing 7 of greater diameter than the original casing, and white of egg fed in around the annulus 8 between the solid yolk and the outer casing 7, as illustrated in FIGURE 4. It will be noted that the lower end of the casing 7 is tied around the pin 6 thus locating the outer container concentrically with respect to the yolk core.

The outer casing is then sealed at the upper end with the pins still in position and the product, as illustrated in FIGURE 5 is boiled in water until the white is firm and the yolk defrosted.

The outer casing is then removed as by being cut away and the pins also taken out. The result is a length of tubular egg with the yolk evenly distributed in the centre as illustrated in FIGURE 6.

Instead of producing a hard-boiled product a product having longer life may be produced by freezing the yolk and the white. Instead of boling as in the process just described, the yolk is frozen after moulding to the desired shape and the white of egg subsequently frozen around it. Thus the first operation in forming the central core of egg yolk is carried out by freezing the egg yolk raw instead of boiled. Otherwise the method is the same as hereinbefore described for hard-boiled eggs.

The second operation in which the egg white is formed about the central core of yolk is modified by freezing the white around the frozen stick of yolk. Otherwise the method is substantially similar to that hereinbefore described with reference to the use of heat to set the yolk and white.

Before use the product made from frozen eggs must be boiled for a sufficient time to coagulate the yolk and white to the same firmness as a hard-boiled egg.

One form of a convenient filler device for use in the process of the invention is illustrated by way of example in FIGURE 7.

A vertical metal tube 20 is secured as by means of a collar 21 to a feed hopper 22 for the egg white or egg yolk. At the other end the tube is formed with a nozzle 23 secured to the tube by means of a quick-release collar 24. Two valves 25, 26 are mounted in the tube 20, one near the end to which the tube is connected to the hopper 22 and one near the nozzle end. The valves 25, 26 are in the form of flap or disc valves and are connected together through linkage so that when one is open the other is closed. Thus the egg white or egg yolk is fed into the tube with the one valve 25 open and the other valve 26 closed.

The valve 26 is then opened and the other valve 25 closed to permit a determined quantity or volume of egg yolk or egg white to pass under gravity into the respective casing advantageously a cylindrical thin plastic casing, which is secured conveniently as by tying around the end of the nozzle. In order that the space in the tube between the two valves may be varied in accordance with the amount of the substance to be used, the tube 20 is formed in two sections connected together by an adjusting sleeve 27.

The filler device may be made of stainless steel.

In the second operation of the method, the central pin embodded in one end of the yolk enters the nozzle so that when the outer casing has been filled with egg white, the operator places the tying cord around the nozzle near the top, and on tightening, the cord slides down the tapered nozzle thus locating the metal pin in the centre of the outer casing.

The invention is not limited to the apparatus hereinbefore described which is merely described as one convenient means for carrying out the invention.

The invention thus overcomes the disadvantage of the natural egg, in preparing it for eating as a cold hard-boiled product, that the egg yolk and white are of unequal proportion in each slice. In the products of the invention each slice contains the same amounts of egg yolk and egg white, but the ratio of egg white to egg yolk in each slice may be varied as desired. Other variations can also be made in the shape and/or diameter of the product and additions, for example in the form of flavouring or in the form of additional substances, such for example as meat or fish, can be added to the egg yolk and/or egg white.

Frozen or dried eggs may be used as the ingredients, the use of which at present is limited to manufacturing processes, baking and the like. Frozen and dried eggs can according to the method and means of the invention be re-formed for use for any purpose for which a natural hard-boiled egg can now be used.

Thus in the manufacture of a product consisting of egg yolk and egg white, the ingredients may consist of:

(a) natural eggs with, if desired, the yolks cooked in their membranes;
(b) frozen egg yolks and frozen egg whites;
(c) dried egg yolks and dried egg whites;
(d) or any combination of (a), (b) and (c).

The end product can be:

(i) cooked (similar to a hard-boiled egg);
(ii) frozen (not cooked until required for use).

In the frozen state the egg product would have a much longer keeping life.

I claim:

1. A method for producing an egg product from natural egg yolk and egg white, comprising the steps of: separating the raw egg yolk and egg white, heating the egg yolk within its natural membrane until cooked firm, moulding the cooked egg yolk into the form of an elongated body, locating the egg yolk body substantially concentrically within an annular body of raw egg white, and heating the concentrically arranged egg yolk body and egg white until the egg white is cooked firm.

2. A method according to claim 1, including the step of freezing the moulded egg yolk body, and wherein the concentrically arranged frozen egg yolk body and raw egg white are heated until the egg white is cooked firm and the egg yolk is defrosted.

3. A method according to claim 2, including the steps of breaking up the firmly cooked egg yolk into powder form prior to the moulding and freezing steps, feeding the broken egg yolk into a first generally cylindrical casing member so as to mould the yolk into said elongated body, removing said first casing member after said freezing step, locating a second generally cylindrical casing member substantially concentrically about said yolk body so as to form an annular space therearound, feeding raw egg white to said annular space so as to form said annular body of egg white around said egg yolk body, and removing said second casing member after the egg white is cooked firm.

4. The method according to claim 3, including the steps of positioning in coaxial alignment anchor means at each end of the frozen yolk body and anchoring said second casing member to said anchor means so as to substantially concentrically locate said second casing member about said yolk body.

5. The method according to claim 3, including the steps of forming said second casing member of a flexible material, embedding in coaxial alignment pin means in each end of the frozen yolk body, and securing the ends of said second casing member to said pin means so as to substantially concentrically locate said second casing member about said yolk body.

References Cited by the Examiner

UNITED STATES PATENTS

| 2,421,199 | 5/1947 | Gutmann | 99—161 |
| 2,525,096 | 10/1950 | Damuth | 99—196 |
| 2,937,095 | 5/1960 | Zitin | 99—174 |

A. LOUIS MONACELL, *Primary Examiner.*

L. M. SHAPIRO, *Assistant Examiner.*